Sept. 20, 1966 R. J. SMILTNEEK 3,273,493
APPARATUS FOR PROCESSING SCRAP MATERIAL
Filed Oct. 13, 1965 5 Sheets-Sheet 1
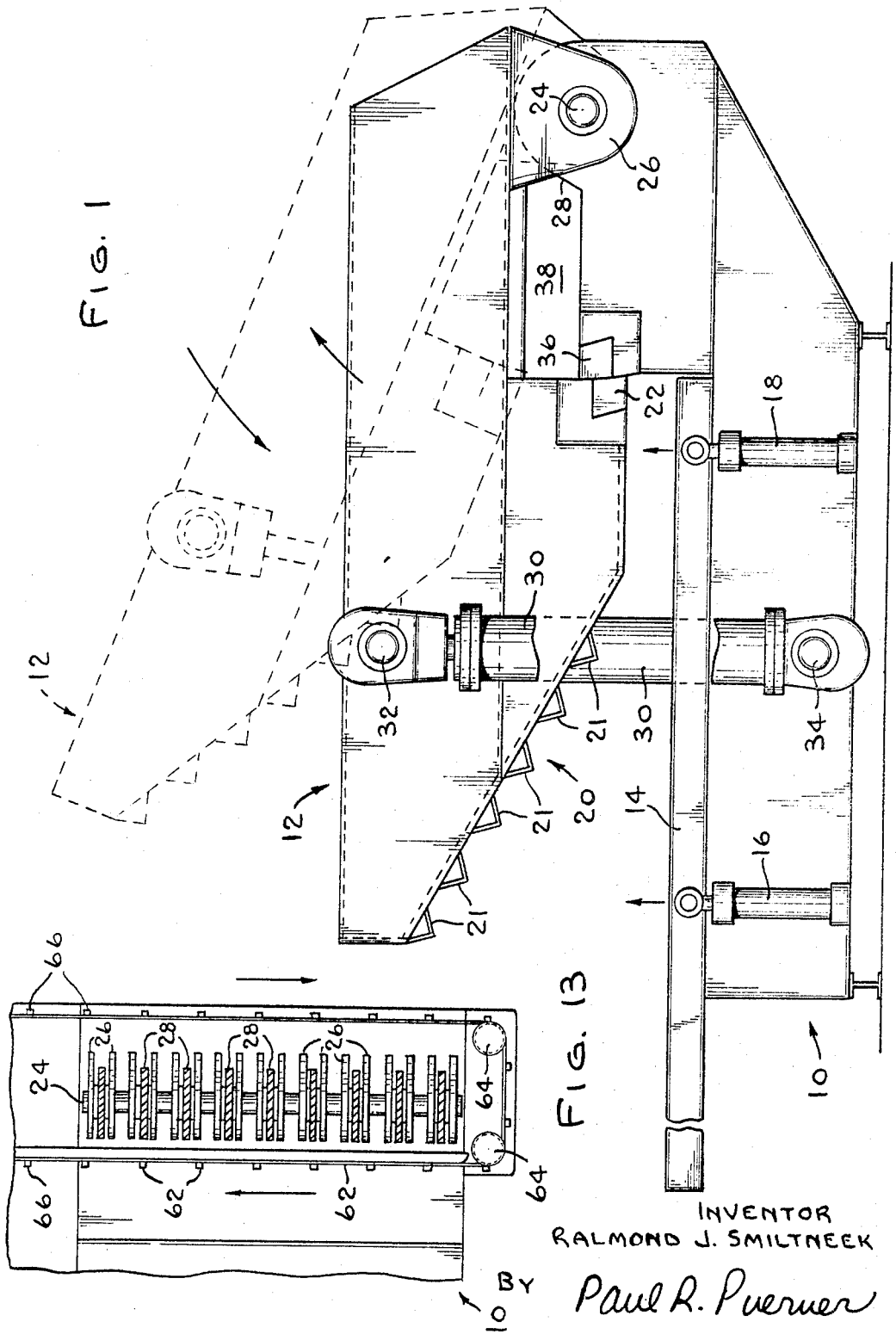
INVENTOR
RALMOND J. SMILTNEEK
BY Paul R. Puerner
ATTORNEY

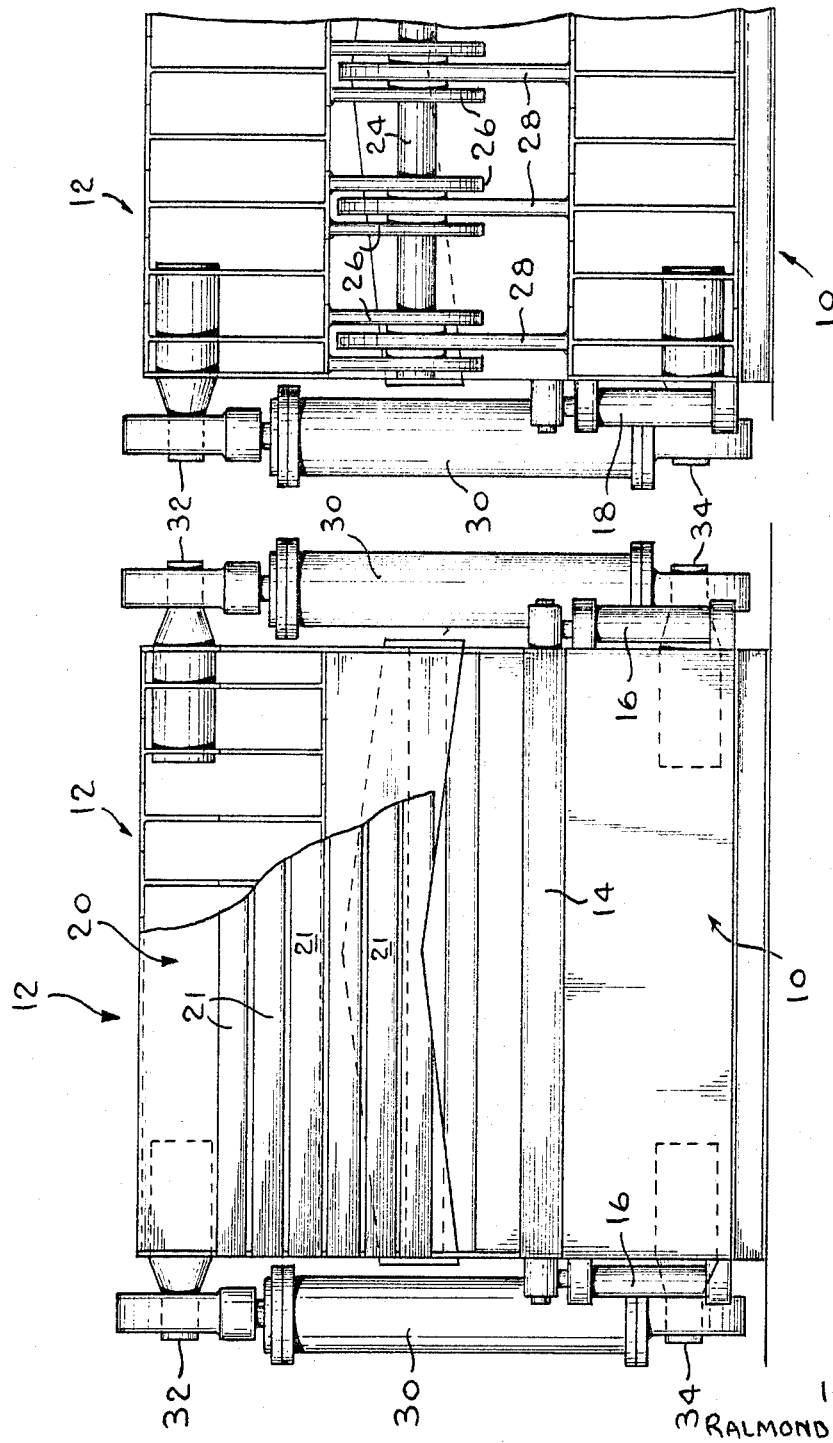

INVENTOR
RALMOND J. SMILTNEEK
BY Paul R. Puerner
ATTORNEY

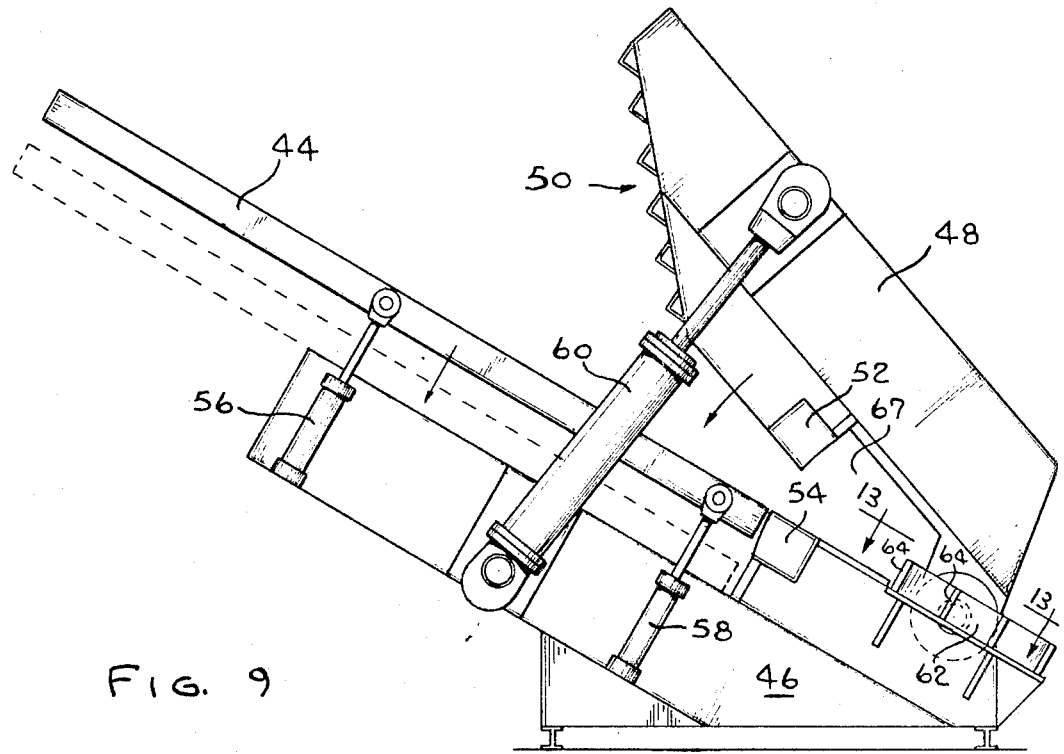

United States Patent Office 3,273,493
Patented Sept. 20, 1966

3,273,493
APPARATUS FOR PROCESSING SCRAP MATERIAL
Raimond J. Smiltneek, Butler, Wis., assignor to Logemann Brothers Company, Milwaukee, Wis., a corporation of Wisconsin
Filed Oct. 13, 1965, Ser. No. 495,409
11 Claims. (Cl. 100—95)

This invention relates to an apparatus for processing scrap material and more particularly to a method and apparatus for compressing and shearing junked automobiles.

The principal object of this invention is to provide an improved apparatus of the type referred to above which is efficient in operation and is of reasonable cost when compared to equipment currently used for a similar purpose.

The objects of this invention are attained by a combination crushing and shearing apparatus which is comprised of a frame having a bed thereon for receiving the scrap materials to be processed, said frame having a shear member mounted thereon. A jaw member is pivotally mounted on the frame and is provided with a crushing portion at the outer end thereof and a shear member mounted thereon between such crushing portion and the point at which the jaw is pivotally mounted on the frame. The shear members on the jaw and frame are adapted to produce a shearing action therebetween when the jaw is pivoted.

In operation the junked auto to be processed is placed on the bed and the jaw is actuated downwardly thereby crushing the front end of the auto between the end of the jaw and the bed. The jaw is then retracted and the auto is pushed further under the jaw. On the next stroke of the jaw the front crushed portion of the body is sheared off by the action of the shear members and at the same time the end portion of the jaw will again crush an additional portion of the auto. This procedure is continued until the entire auto is crushed and sheared into relatively small pieces.

Other objects and advantages will be pointed out in, or be apparent from the description and claims, as will obvious modifications of the several embodiments shown in the drawings, in which:

FIG. 1 is a side elevation view of one embodiment of a shear mechanism made in accordance with this invention;

FIG. 2 is a front elevation view (with parts broken away) of the shear mechanism shown in FIG. 1;

FIG. 3 is a fragmentary rear elevation view of the shear mechanism shown in FIG. 1;

FIG. 9 is a side elevation view of a second embodiment of a shear mechanism made in accordance with the present invention;

FIG. 10 is a side elevation view of a third embodiment of a shear mechanism made in accordance with the present invention;

FIG. 13 is a fragmentary sectional view taken along line 13—13 of FIG. 9.

Figure 4:
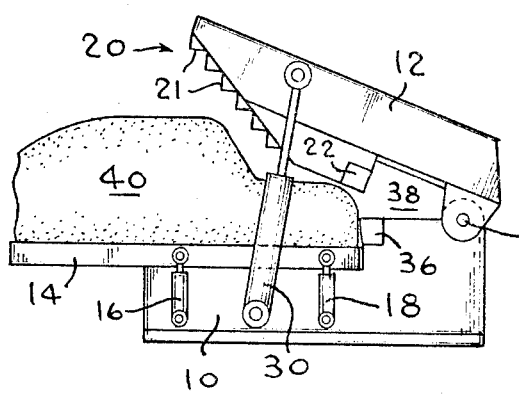
FIGS. 4, 5, 6, 7 and 8 are partially schematic side elevation views of the shear mechanism of this invention showing its sequence of operation.

Referring to the drawings in detail, FIGS. 1-3 show one embodiment of this invention which includes a frame designated generally by reference numeral 10 having a pivoted jaw member 12 mounted thereon. A movable bed 14 is mounted on frame 10 and is adapted for vertical movement by means of pairs of power cylinders 16, 16 and 18, 18 mounted on either side of the frame as shown.

Pivoted jaw member 12 is comprised of a crushing portion 20 at its outer end (having crushing angles 21 mounted thereon) and a shear knife member 22 mounted between such crushing portion and the point at which the jaw member is pivotally connected to the frame. The jaw member is pivotally mounted on the frame by means of a shaft 24 which passes through mating lug members 26, 28 fastened to the jaw member and frame respectively, as clearly shown in FIG. 3. The jaw member 12 is actuated by means of a pair of power cylinders 30, 30 which are operatively connected between the frame and jaw by means of pivots 32 and 34 mounted on the jaw and frame respectively.

The shear knife member 22 mounted on the jaw member 12 is adapted for shearing relationship with a stationary shear knife member 36 mounted on the frame adjacent the rear of movable bed member 14.

As shown in FIG. 1, the stationary shear knife 36 on frame 10 is positioned at an elevation higher than that of bed 14 when such bed is in its lowermost position. It should also be noted that an open space 38 is provided between the shearing surfaces of the two shear knives and the pivot shaft 24, the purpose of which will be more fully explained hereinafter.

Operation

Having thus described in a general manner the construction of the mechanism, its operation is as follows.

In describing the operation of the present mechanism reference is made to the partially schematic views of the device shown in FIGS. 4-8. As indicated previously, the mechanism of this invention is particularly designed to process scrap metal in the form of junked automobiles. When designed for such use the width of bed 14 is made wide enough (about 9 feet) to receive the entire body of the junked automobile in a cocked position to thus facilitate shearing of the automobile axles.

Referring now to FIG. 1, the mechanism is shown with the jaw 12 in its open position and with the automobile body 40 inserted into the mechanism and resting on bed 14 which is in its lowered position. The next step is to actuate jaw 12 from the position shown in FIG. 4 to that shown in FIG. 5 by energizing cylinders 30. As the jaw is retracted the crushing angles 21 on the crushing portion 20 of the jaw will engage the forward end of the auto body 14 and cause it to be deformed or compressed to the general configuration such as that shown in FIG. 5.

Figure 6:
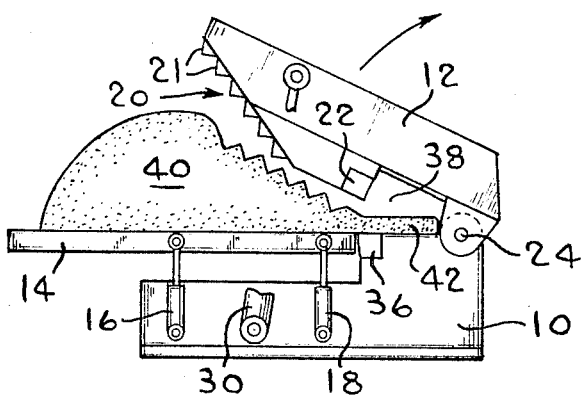

The next step is to retract or open the jaw 12 and at the same time energize cylinders 16 and 18 to thereby raise bed 14 to the position shown in FIG. 6. With the jaw retracted and the bed in its raised position the partially crushed automobile body can then be pushed further into the mechanism with the forward end of the body extending all the way into the shear space 38, also as shown in FIG. 6.

Figure 7:
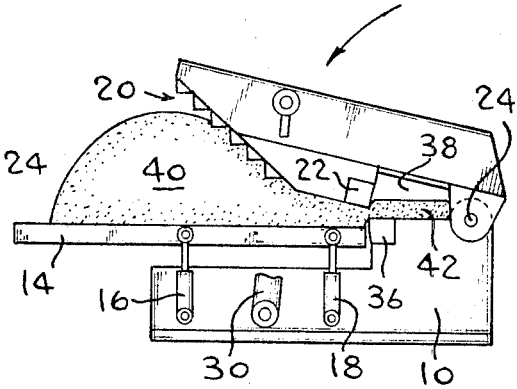
Figure 5:
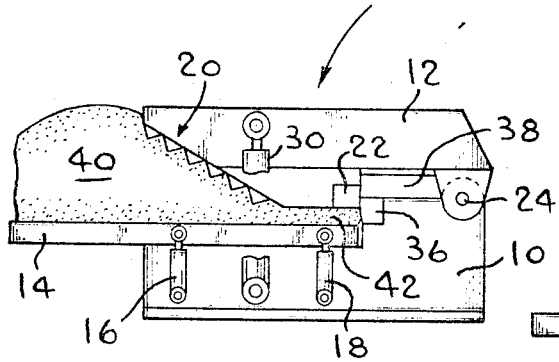
Figure 8:
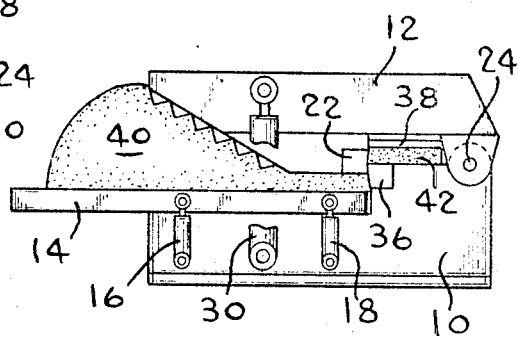

With the parts in such position the jaw is again retracted by energizing cylinders 30 to thus move the jaw from the position shown in FIG. 6 to that shown in FIG. 7 and then to its final position as shown in FIG. 8.

This final power stroke performs two functions. First the shear knives 22, 36 on the jaw and frame respectively coact to shear off the front crushed portion 42 of the auto body. The second function is to perform another crushing operation of that portion of the auto body located beneath the crushed teeth 21 on bed 14. Thus, as shown in FIG. 8, upon the completion of the second crushed stroke a piece of scrap material 42 will have been sheared off the auto body and can then be discharged to the machine out to either side thereof. These sheared portions, of course, are of much smaller volume than the material upon entry into the machine and can be further processed as necessary before their final use such as charging into a blast furnace.

It will be noted as shown in FIGS. 7 and 8 that as the jaw member 12 is energized on its final power stroke the bed 14 will be lowered to the position shown in FIG. 8 from that shown in FIG. 7. This lowering of bed 14 allows the shearing action at shear knives 22, 36 to take place freely and also allows the jaw member to reach its fully closed position. With the parts shown in FIG. 8, the entire process is again repeated until the entire auto body has been crushed and sheared in the manner previously described. As previously indicated, it is preferable that auto 40 be cocked slightly when it is fed into the machine for the final combined shearing and compression stroke. Such cocked position will facilitate cutting of the auto axles by the action of shear knives 22, 36.

Modifications

Referring now to the other embodiments of the present invention as shown in the drawings, reference is made first to the embodiment shown in FIG. 9. This embodiment is substantially identical to that shown in FIGS. 1–3 except that movable bed 44 is mounted at an angle with the horizontal on the frame 46 so that the material being fed into the machine can be moved forward into the machine more readily on the inclined surface of bed 44. The other parts of the mechanism are substantially identical to that of the FIG. 1 embodiment, there being a jaw member 48 pivotally mounted on the frame and having a crushing portion 50 and a shear knife 52 arranged for cooperation with the stationary shear knife 54 mounted on the frame as shown. The bed is actuated by cylinders 56, 58 and the jaw is actuated by cylinders 60.

A further refinement of the FIG. 9 embodiment is shown in detail in FIG. 13. Such refinement is comprised of an endless belt member 62 reeved around rollers 64 and driven in the direction of the arrows shown by any suitable drive mechanism (not shown). As shown, the belt 62 is provided with a plurality of cleat members 66 which will engage the sheared pieces and carry them from the machine out to the side thereof after the shearing operation has been completed. The belt, it is noted, is positioned to move in vertical planes with one reach of the belt positioned to move directly adjacent the shear space 67 produced by cutting out a portion of jaw 48 adjacent shear members 52 and 54. The belt travels around the pivotal connection between the jaw and the frame and thus requires only light modification of the basic machine. It will be understood, of course, that such an automatic discharge arrangement could be provided on the other embodiments of this invention disclosed herein.

Another embodiment of the present invention is shown in FIG. 10. In such embodiment, just as in FIG. 9, the bed member 68 is positioned at an angle with the horizontal to facilitate the feeding movement of the scrap to be processed. Bed 68, however, instead of being actuated by a pair of cylinders is pivoted at its front end to the frame and is actuated by a single pair of cylinders 70 from the position shown in full lines in FIG. 10 to that shown in dotted lines therein. The operation of the device is otherwise the same as that described with respect to FIGS. 4–8.

Figure 11:
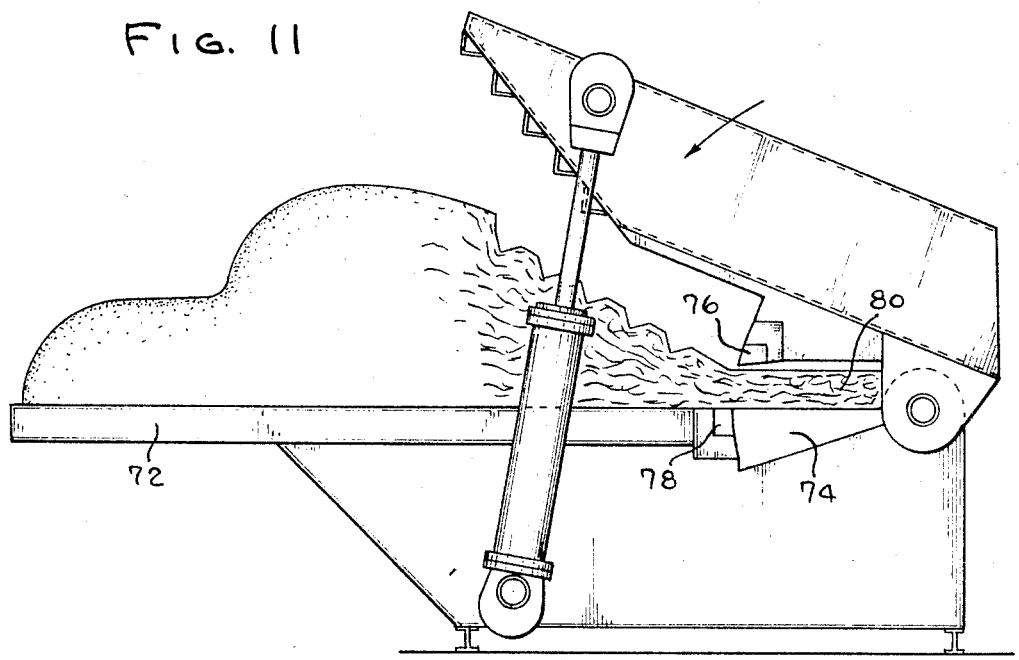
FIGS. 11 and 12 are side elevation views of a fourth embodiment of a shear mechanism made in accordance with the present invention.
Figure 12:
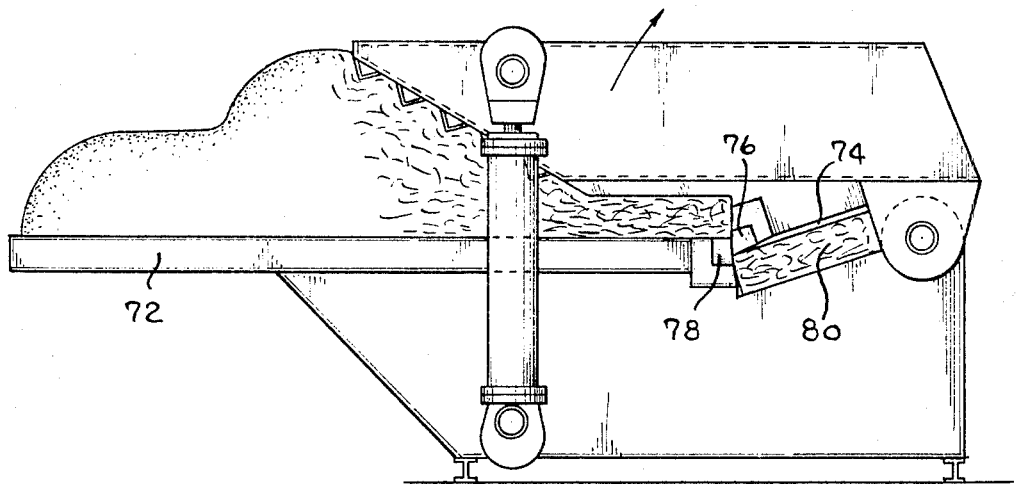

A final embodiment of the invention is shown in FIGS. 11 and 12. In this embodiment the bed 72 is stationary and a shear space 74 is provided at an elevation below that of the top of bed 72. The shear knife arrangement is also somewhat different in this embodiment with the cutting edge of the movable blade 76 facing away from the pivot point and the cutting edge of the stationary blade 78 facing toward the pivot point. This, of course, is just the opposite from the arrangement shown in the previous embodiments.

In the FIGS. 11, 12 embodiment, the auto body is inserted partially into the machine and the front end thereof is crushed just as in the other embodiments. This operation is not shown in the drawings. The jaw is then raised and the crushed portion 80 at the front of the auto body is then inserted all the way into the machine whereby the parts assume the position shown in FIG. 11. The jaw is then lowered to the position shown in FIG. 12 whereby the front portion 80 of the auto body is sheared off by knives 76 and 78 and falls downwardly into space 74. Just as in previous embodiments, this combined shearing and crushing stroke in the cycle will not only shear off the end of the scrap but will crush a further portion of the auto body at the same time. The advantage of the FIGS. 11 and 12 arrangement, of course, is that it is of somewhat simpler design in that the movable bed arrangement of previous embodiments is eliminated.

Although several embodiments of the present invention have been illustrated and described, it will be apparent to those skilled in the art that various changes and modifications may be made therein without departing from the spirit of the invention or from the scope of the appended claims.

The invention claimed is:

1. A material processing machine comprising:
   a frame having a bed thereon for receiving material to be processed, said frame further provided with a shear member mounted thereon, said bed on said frame being movable with respect to said frame;
   a jaw member pivotally mounted on said frame, said jaw member having a crushing portion at the outer end thereof and a shear member mounted thereon between said crushing portion and the point at which it is pivotally mounted on said frame, said shear members on said jaw and frame adapted when said jaw is pivoted to produce a shearing action therebetween; and
   a power means for pivoting said jaw on said frame.

2. A material processing machine comprising:
   a frame having a bed thereon for receiving the material to be processed, said frame further provided with a shear member mounted thereon;
   a jaw member pivotally mounted on said frame, said jaw member having a crushing portion at the outer end thereof and a shear member mounted thereon between said crushing portion and the point at which it is pivotally mounted on said frame, said shear members on said jaw and frame adapted when said jaw is pivoted to produce a shearing action therebetween, said bed on said frame being positioned at an angle with the horizontal and sloping downwardly toward the point at which said jaw is pivotally mounted on said frame; and
   a power means for pivoting said jaw on said frame.

3. A material processing machine comprising:
   a frame having a bed thereon for receiving the material to be processed, said frame further provided with a shear member mounted thereon;
   a jaw member pivotally mounted on said frame, said jaw member having a crushing portion at the outer end thereof and a shear member mounted thereon between said crushing portion and the point at which it is pivotally mounted on said frame, and shear members on said jaw and frame adapted when said jaw is pivoted to produce a shearing action therebetween, said jaw member further provided with a cut-out portion to provide an open space adjacent said shear members between said members and the point at which said jaw member is pivotally mounted on said frame; and
   a power means for pivoting said jaw on said frame.

4. A material processing machine comprising:
   a frame having a bed thereon for receiving materials to be processed, said frame further provided with a shear member mounted thereon;

a jaw member pivotally mounted on said frame, said jaw member having a crushing portion at the outer end thereof and a shear member mounted thereon between said crushing portion and the point at which it is pivotally mounted on said frame, said shear members on said jaw and frame adapted when said jaw is pivoted to produce a shearing action therebetween, said frame being provided with a cut-out portion to provide an open space adjacent said shear members between said members and the point at which said jaw member is pivotally mounted on said frame; and a power means for pivoting said jaw on said frame.

5. A material processing machine according to claim 4 in which the cutting edge of said shear member mounted on said frame faces toward the point at which said jaw member is pivotally mounted on said frame, and in which the cutting edge of said shear member mounted on said jaw member faces away from the point at which said jaw member is pivotally mounted on said frame.

6. A material processing machine comprising:
a frame having a bed thereon for receiving materials to be processed, said frame further provided with a shear member mounted thereon;
a jaw member pivotally mounted on said frame, said jaw member having a crushing portion at the outer end thereof and a shear member mounted thereon between said crushing portion and the point at which it is pivotally mounted on said frame, said shear members on said jaw and frame adapted when said jaw is pivoted to produce a shearing action therebetween;
a movable discharge member on said frame operative to automatically move the sheared pieces from the machine; and
a power means for pivoting said jaw on said frame.

7. A material processing machine according to claim 6 in which said discharge member is an endless belt having a plurality of cleats thereon, said belt being reeved to travel around the pivotal connection between said jaw and said frame.

8. A machine for processing scrap material such as automobile bodies and the like comprising:
a frame having a horizontal bed thereon for receiving scrap material such as an automobile body thereon, said frame further provided with a first shear member mounted thereon;
a jaw member pivotally mounted on said frame, said jaw member having a crushing portion at the outer end thereof and a second shear member mounted thereon between said crushing portion and the point at which it is pivotally mounted on said frame, said first and second shear members on said jaw and frame adopted when said jaw is pivoted to produce a shearing action therebetween, said frame and said jaw members being positioned and shaped to provide an open shear space adjacent said first and second shear members, said open shear space adapted to receive and accommodate material shared by the action of said first and second shear members; and a power cylinder means for pivoting said jaw on said frame.

9. A material processing machine comprising:
a frame having a bed member movably mounted thereon for receiving material to be processed, said bed member mounted for movement between an upper and a lower elevation, said frame further provided with a stationary shear member mounted thereon at said upper elevation adjacent said bed member;
a jaw member pivotally mounted on said frame, said jaw having a crushing portion at the outer end thereof adapted for crushing material between it and said bed when said jaw is pivoted downwardly, said jaw member further having a shear member mounted thereon between said crushing portion and the point at which it is pivotally mounted on said frame, said shear members on said jaw and frame adapted when said jaw is pivoted to produce a shearing action therebetween; and a power means for pivoting said jaw on said frame.

10. A material processing machine according to claim 9 in which said bed is movably mounted on said frame by means of two sets of power cylinders operatively connected between said bed and said frame.

11. A material processing machine according to claim 9 in which said bed is movably mounted on said frame by a pivotal connection between said bed and said frame at one end of said bed and a pair of power cylinders operatively connected between the other end of said bed and said frame.

References Cited by the Examiner
UNITED STATES PATENTS

| | | | |
|---|---|---|---|
| 657,272 | 9/1900 | Lord. | |
| 2,986,992 | 6/1961 | Patros et al. | 100—218 |
| 3,077,827 | 2/1963 | Bunke et al. | 100—215 |

FOREIGN PATENTS 845,438    11/1952    Germany.

WALTER A. SCHEEL, *Primary Examiner.*